May 13, 1930. L. BEHR 1,758,494
RELATIVE HUMIDITY RECORDER
Filed March 4, 1926   3 Sheets-Sheet 1
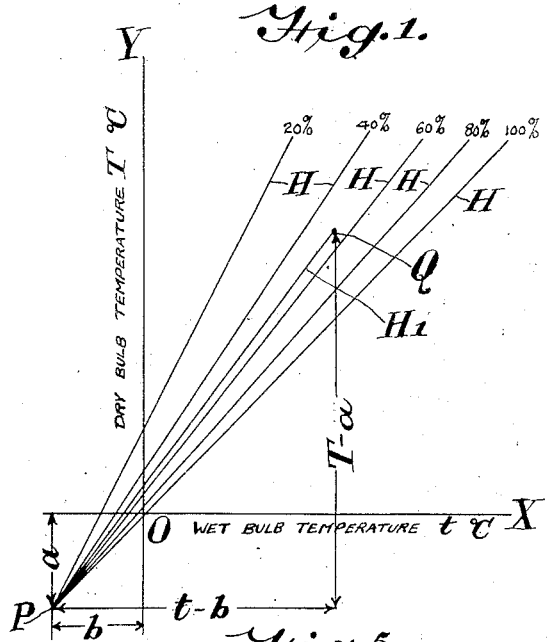
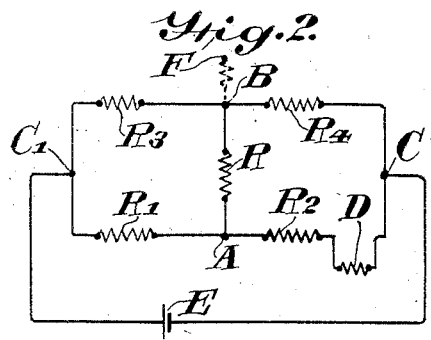
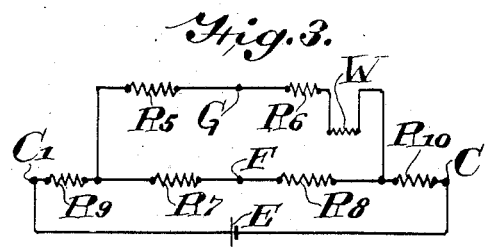
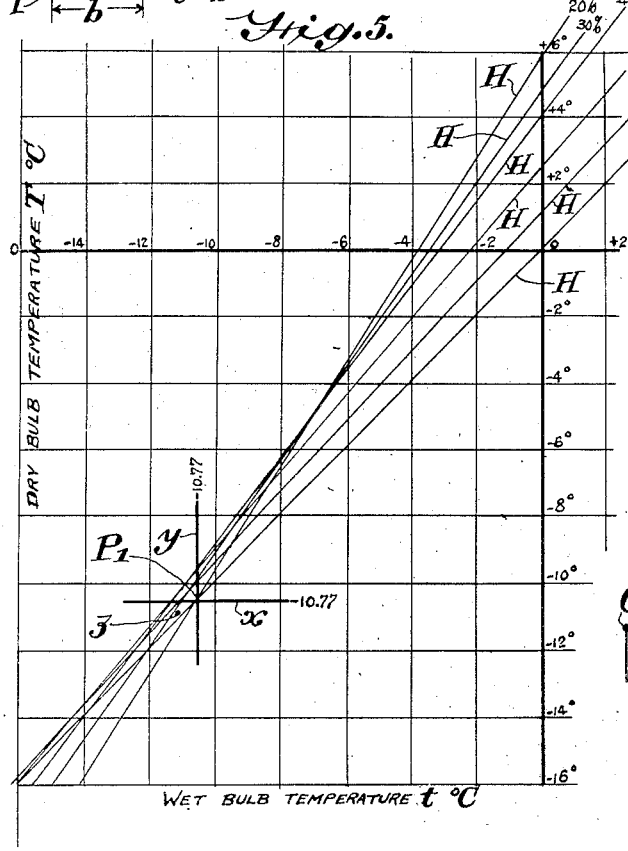
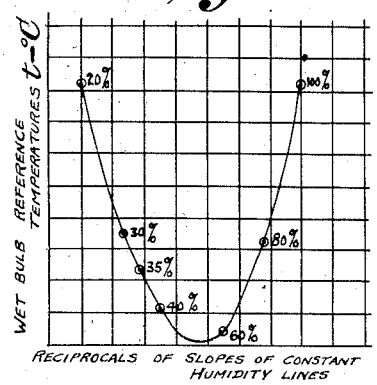
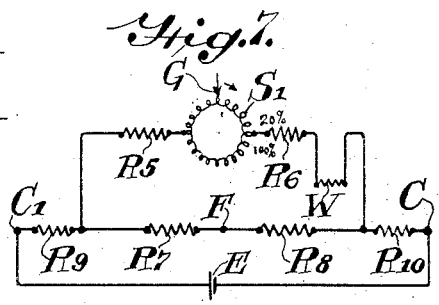
INVENTOR.
Leo Behr
BY Cornelius D. Ehret
his ATTORNEY.

May 13, 1930.  L. BEHR  1,758,494
RELATIVE HUMIDITY RECORDER
Filed March 4, 1926  3 Sheets-Sheet 2

INVENTOR.
Leo Behr
BY
Cornelius L. Ehret
ATTORNEY.

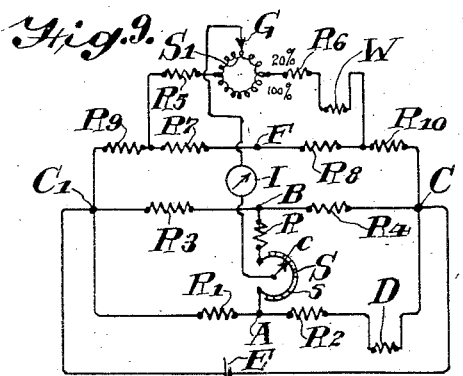
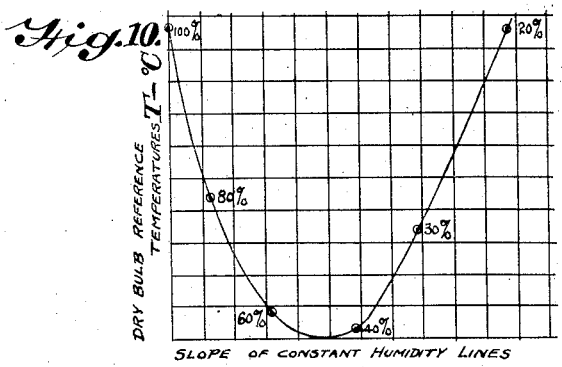
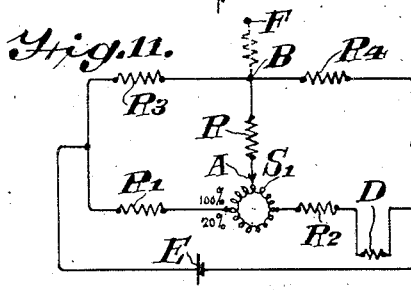
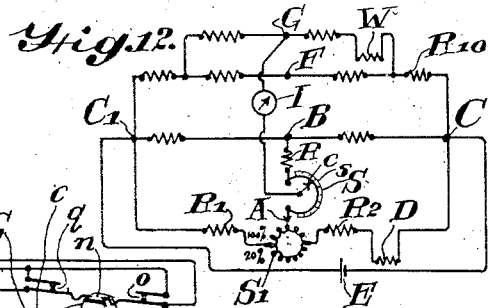
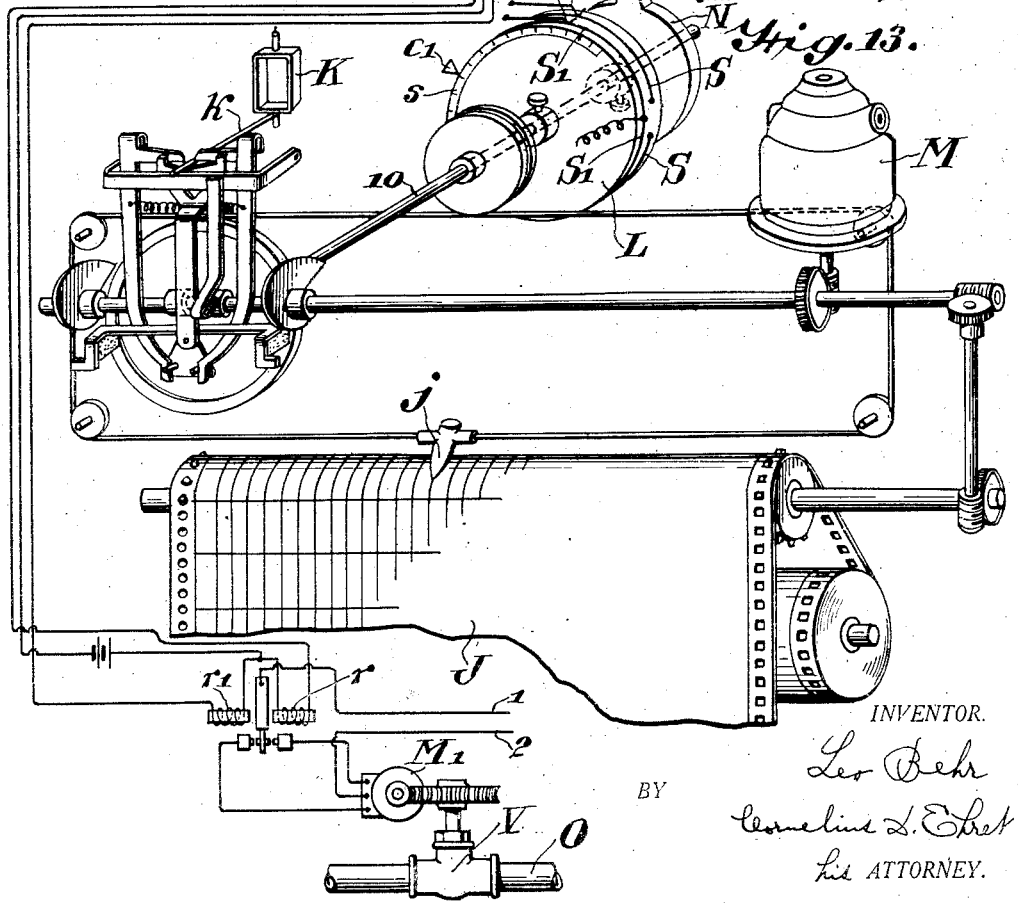

Patented May 13, 1930

1,758,494

UNITED STATES PATENT OFFICE

LEO BEHR, OF ITHACA, NEW YORK, ASSIGNOR TO LEEDS & NORTHRUP COMPANY, OF PHILADELPHIA, PENNSYLVANIA, A CORPORATION OF PENNSYLVANIA

RELATIVE-HUMIDITY RECORDER

Application filed March 4, 1926. Serial No. 92,158.

My invention relates to measurement, and more particularly recording or control, of relative humidity, that is, the ratio of the amount of vapor actually present in air or other gas as compared with the greatest amount the air or other gas possibly could contain at a given temperature.

In accordance with my invention measurement of relative humidity is effected by determining the ratio of potential differences representative of or proportional to, respectively, the departure of the dry and wet bulb temperatures from a predetermined reference temperature, assumed to be constant, by balancing one of the potential differences or a predetermined portion of it against the entire or a portion of the other potential difference in a null potentiometer system.

More particularly in accordance with my invention, there is effected compensation or correction for the errors arising from the fact that the aforesaid reference temperature is not in fact constant, because there is no single reference temperature which is with accuracy utilizable for a plurality of different humidities, that is, for substantially different humidities throughout a relatively wide range there is no single temperature to which the dry and wet bulb temperatures may be referred for accurately determining the relative humidities within that range; and to this end my invention comprehends the modification in suitable sense and to suitable extent one of the aforesaid potential differences utilized in determining relative humidity, or the modification of the combined effect of those potential differences.

Further in accordance with my invention the relation to each other of the potential differences determinative of relative humidity is utilized to produce an indication or record of the relative humidity, or to effect a control of any suitable character, particularly that of the relative humidity.

My invention resides further in an electrical network in the nature of or generally equivalent to a Wheatstone bridge, in a conjugate conductor of which is included a source of electro-motive-force, and in another conjugate conductor of which is included an impedance, and the indicating, deflecting, or voltage- or current-responsive device, generally a galvanometer, is connected externally to the second named conjugate conductor but in a relation thereto characterized by the fact that one terminal of the galvanometer branch is related to any suitable point in the second conjugate conductor, and the other terminal is connected to a second point at which the potential is either fixed or varies; and more particularly said other terminal of the galvanometer branch is connected to a point of fixed potential in a branch related to the Wheatstone bridge or equivalent; or more particularly to a point in a second Wheatstone bridge or equivalent whose potential varies but is related to that of the point of fixed potential.

My invention resides in a method, apparatus and circuit arrangements of the character hereinafter described and claimed.

For an understanding of my method, and for an illustration of some of the forms my apparatus and circuits may take, reference is to be had to the accompanyng drawings in which:

Fig. 1 is a graphic representation of lines whose slopes are indicative of different relative humidities, related to a single common reference temperature.

Fig. 2 is an explanatory diagram illustrating a mode of procuring a potential difference which is a function of the departure of the dry or wet bulb temperature from a predetermined reference temperature.

Fig. 3 is an explanatory diagram illustrating a further mode of procuring a potential difference which is a function of the departure of the dry or wet bulb temperature from a predetermined reference temperature.

Fig. 5 is a graphic representation of the true state of facts, as distinguished from Fig. 1, as regards non-existence of a single reference temperature, common to different humidities throughout a relatively wide range.

Fig. 6 is a graphic representation of the relation of wet bulb reference temperatures to the slopes of constant humidity lines, assuming a constant dry bulb reference temperature.

Fig. 7 is a diagram of a circuit arrangement, in general similar to Fig. 3, with introduction of correction or compensation for the departure of the facts illustrated by Fig. 5 from the ideal indicated in Fig. 1.

Fig. 9 is a diagram of a composite circuit embodying the circuit arrangements of Figs. 2 and 7.

Fig. 10 is a graphic representation of the relations of dry bulb reference temperatures to the slopes of constant humidity lines, assuming constant wet bulb reference temperature.

Fig. 11 is a diagram of a circuit arrangement alternate to that of Fig. 7 for effecting compensation or correction in a system of the character indicated in Fig. 2.

Fig. 12 is a diagram of a composite circuit arrangement embodying the systems of Figs. 11 and 3.

Fig. 13 is in part a diagram and in part a perspective of automatic indicating, recording or control apparatus utilizable in accordance with my invention.

Figure 4:
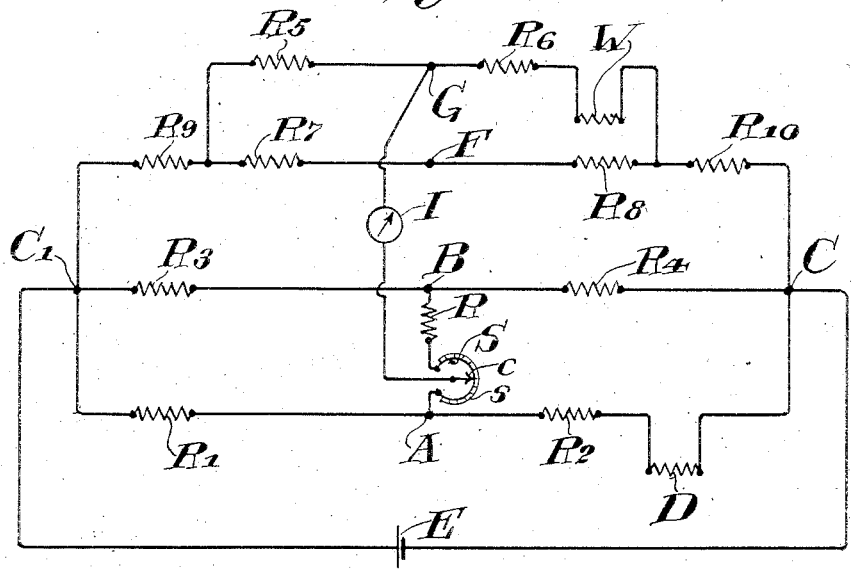
Fig. 4 is a diagram of a composite system including arrangements of the character of Figs. 2 and 3.

Referring to Fig. 1, ordinates are dry bulb temperatures and abscissæ wet bulb temperatures, both in degrees centigrade. The figure illustrates the general but incorrect assumption heretofore generally made, to wit, that the ratio of the departure of the dry bulb temperature to the departure of the wet bulb temperature from a predetermined single fixed reference temperature is unique for each magnitude of relative humidity. In Fig. 1 the several humidities are indicated by the straight lines H, for the range, for example, from 20 per cent to 100 per cent humidity, all converging or intersecting at a single point P representative of a single predetermined reference temperature. Fig. 1, therefore, assumes an ideal but untrue state of facts. In accordance with Fig. 1, the ratio of departure of dry bulb temperature to departure of wet bulb temperature from a single reference temperature, defines the slope of a straight line which uniquely represents or determines the corresponding humidity, regardless of the actual temperatures of the dry and wet bulbs.

The axes O, Y and O, X, of ordinates and abscissæ, respectively, intersect at the origin O, corresponding with zero degree temperature of both dry and wet bulbs. The co-ordinates $a$ and $b$ of the single reference point P are both negative. For any point as Q, whose co-ordinates are T and $t$, the difference in temperature of the dry bulb with respect to the point P is $(T-a)$ and the difference in temperature of the wet bulb with respect to the point P is $(t-b)$; the ratio of $(T-a)$ to $(t-b)$, which is always greater than or equal to unity, determines the slope of the humidity line $H^1$ passing through points Q and P.

In accordance with my invention, in its broader aspect, potential differences representative of or proportional to $(T-a)$ and and $(t-b)$, respectively, are combined or jointly utilized in a way representative of the ratio of $(T-a)$ to $(t-b)$, thereby determining the relative humidity whose line, as $H^1$, is thus uniquely determined.

In a potentiometric system or network, the potential difference, preferably the total potential difference, across a slide wire, is made proportional to $(T-a)$, and another potential difference is made proportional to $(t-b)$; and by balancing one potential difference or a portion thereof against the other, or a portion thereof, as procured by adjustment of a contact along a slide wire, or equivalent, the position of balance is an indication or measure of the desired ratio, and, therefore, of the relative humidity.

One of the circuits contributory to accomplishment of this result is indicated in Fig. 2, in which an elemental or simple network is disclosed. In one branch is included a thermometer resistance D, of either the dry or wet bulb thermometer, but, as indicated, and preferably, of the dry bulb thermometer. In the same branch are the fixed resistances $R^1$ and $R^2$, and in the other branch are included two equal fixed resistances $R^3$ and $R^4$. Connected between the pairs of resistances in the different branches, as between the points A and B, is the resistance R which generically represents a resistance a part of which may be a slide wire utilized as more particularly hereinafter described in connection with Fig. 4. The resistances R to $R^4$, inclusive, are of material such as manganin, having zero or negligible temperature co-efficient, while the thermometer resistance D is of nickel or other suitable material having a substantial temperature co-efficient. The two branches are in the circuit of the source of electromotive-force E, as the battery or other direct current source, though it should be understood that the broad principles of my invention are applicable also to cases where E is a source of fluctuating or alternating current when suitable or desirable, as when capacitative or inductive reactances are utilized in lieu of or with non-inductive resistances.

It is possible so to proportion the various resistances that the current through R and, therefore, the potential difference between the points A and B shall be directly proportional to the departure of the temperature of the thermometer resistance D from some fixed reference temperature. This, however, is not in itself sufficient because the potential of neither the point A nor the point B is fixed, and this deficiency, as will later appear, prevents a balance by simple adjustment of a single point along a slide wire resistance of the two potential differences representing, respectively, the aforesaid quantities $(T-a)$ and $(t-b)$.

If, however, it be imagined, as indicated by the dotted line in Fig. 2, a resistance, whose magnitude is one-half that of $R^3$ or $R^4$, has its one terminal connected to the point B, and some external source maintains a current through this resistance of the same magnitude as that through the resistance R, then at the other terminal, F, of the imaginary resistance, there will exist a fixed potential which is the mean of that at the points C and $C^1$. The resistance may, therefore, be considered as extending from the point F to the point A, with only that portion between points B and A available or utilized for balancing against another potential difference representative of the aforesaid quantity $(t-b)$, for the departure of the wet bulb temperature for example from the reference temperature. This range, however, is generally ample for there is usually little practical advantage in the measurement of relative humidity below about 10% or 20%, though the portion of the resistance available can be made sufficiently large for any range.

It is desired that the current through the resistance R shall be proportional to the departure of the temperature of the thermometer resistance D from a fixed reference temperature, such as $-a$ at P, Fig. 1. Under these circumstances, the potential difference between the points F and A will be proportional to the departure of the temperature of the resistance D from the aforesaid fixed reference temperature, since the resistance from F to B and from B to A is constant.

Such desired magnitude of the current through the resistance R may be procured by suitable magnitudes of the resistances $R^1$, $R^2$, $R^3$ and $R^4$, whose respective magnitudes, or some of them, are related to the magnitude of the thermometer resistance D, at, for example, zero degrees centigrade. These magnitudes of the several resistances may be arrived at by calculation or by trial.

For example, the thermometer resistance D may have a magnitude, at zero degrees centigrade, of 47.1569 ohms; the resistance $R^3$ and $R^4$ may be 50 ohms each; resistance R, 75 ohms; resistances $R^1$ and $R^2$, 4.0961 and 3.1411 times, respectively, the resistance D at zero degrees centigrade; and the fixed reference temperature $-10.77$ degrees centigrade.

The potential difference between the points F and A is the aforesaid resistance of 47.1569 ohms, the resistance of D at zero degrees centigrade, multiplied by the current through the resistance R, multiplied in turn by a factor which is the sum of the ratio of the resistance R to the resistance D at zero degrees centigrade plus the resistance $R^3$ (or $R^4$) divided by twice the resistance of D at zero degree centigrade.

While, as above indicated, the circuit of Fig. 2 may include either the dry or wet bulb thermometer resistance, there is a gain in sensitivity by using the dry bulb resistance in this circuit and using the wet bulb resistance in a circuit arrangement about to be described.

A circuit arrangement including the other thermometer resistance, preferably the wet bulb resistance, is required for procuring a potential difference proportional to the departure of the wet bulb temperature from the fixed reference temperature.

This last-named potential difference should satisfy several requirements, viz: (a) it should be obtained from the same source of current used in the dry bulb circuit, as Fig. 2, in order that the system as a whole shall be independent of changes in voltage of the source; (b) one point in the circuit should have the same potential as the point F in the dry bulb circuit, Fig. 2, in order that it shall be possible to balance the two desired potential differences against each other by the automatic adjustment of but a single point on a suitable resistance; (c) the ratio of $(T-a)$ to $(t-b)$ being always greater than or equal to unity, to make the potential difference across the resistance as R of the dry bulb circuit, Fig. 2, greater than the potential difference to be balanced, the proportionality factor between the potential difference to be balanced and $(t-b)$ must not be greater than that between the potential difference across the resistance and $(T-a)$.

For these purposes a circuit arrangement of the character of Fig. 3 is utilized in which W is the wet bulb thermometer resistance, resistances $R^5$ and $R^6$ bearing predetermined ratios to the resistance W at a predetermined temperature, for example, zero degree centigrade, resistances $R^7$ and $R^8$ are fixed resistances equal in magnitude, and resistances $R^9$ and $R^{10}$ are fixed resistances equal in magnitude. The source E has an electro-motive-force of the same magnitude as that of the source E, Fig. 2. All of the resistances, except W, are again of manganin or other material having zero or negligible temperature co-efficient, while the thermometer resistance W is of some such material as nickel having a positive temperature co-efficient which increases with rise of temperature.

By suitable selection of magnitudes for the various resistances commensurate with the characteristics of the thermometer resistance W, the potential difference between the points G and F may be made at all times proportional to the departure of the temperature of the resistance W from the fixed reference temperature.

For example the resistance of the thermometer resistance W at zero degree centigrade may be 47.512 ohms; $R^5$ may be made 56.591 ohms; $R^6$ 11.221 ohms; each of the resistances $R^7$ and $R^8$ may be made 76.898 ohms; and each of the resistances $R^9$ and $R^{10}$ may be made 100 ohms.

Requirement (a), above stated, is satisfied by using for the circuit of Fig. 3 the source E of Fig. 2; the requirement (b) is satisfied by making the point F, Fig. 3, the same as the point F, Fig. 2; and the requirement (c), regarding the proportionality factor, is satisfied by making resistances $R^9$ and $R^{10}$ of suitable magnitudes.

The circuit arrangements of Figs. 2 and 3 are combined into a single or composite potentiometric system or network as indicated in Fig. 4, in which the two branches between the points C and $C^1$ of Fig. 2 are connected between the points of C and $C^1$ of Fig. 3, a single source, E, serving for the entire network.

In Fig. 4 the first component network, in the nature of a Wheatstone bridge or double branch potentiometer, comprises the arms $C^1$—B, B—C, $C^1$—A and A—C. In the first conjugate conductor is connected the source of electro-motive-force E; in the second conjugate conductor, between A and B, is included an impedance, in the specific example illustrated the resistance R and slide wire resistance S. Ordinarily the galvanometer or equivalent is connected in the conjugate conductor between the points A and B. In the present instance however the galvanometer I is in a branch conductor one terminal of which is c, which may be at any suitable point in the second conjugate conductor, and more particularly at any point along the impedance in the second conjugate conductor A—B; and the other terminal of the galvanometer branch conductor is connected to a point, in a second component network branched upon the first component network, whose potential is either fixed or variable.

More particularly, the other terminal of the galvanometer branch conductor, at G as specifically illustrated in Fig. 4, partakes of a potential which may be fixed, and either equal to or dependent upon the potential of a point such as F of fixed potential, or the potential at G varies under circumstances of variation of the impedance W. The addition to or branching upon the first named Wheatstone bridge or equivalent of the two parallel branches $R^7$, $R^8$, and $R^5$, $R^6$, W, constituting a circuit in the nature of a Wheatstone bridge, in effect includes in series with the instrument I in the galvanometer branch conductor a potential difference or source of electro-motive-force which is either fixed or variable, according as the impedance W is constant or varies. The potential of the point c on the slide wire resistance S varies with variation of impedance in any arm of the first bridge, and particularly because of variation of the impedance D; and the potential at the point G in the branch network varies in dependence upon conditions in the branch network, as for example upon the magnitude of the impedance W. The galvanometer I therefore is connected between points of substantially independent networks between points which individually vary in potential in accordance with changes of magnitudes of impedances therein. Balance or zero current through the galvanometer I obtains only when the difference of potential between the points c and G is zero, whatever may be the absolute potential of each of the points c and G. Similarly with a given difference of potential between the points c and G, whatever their absolute potentials, a current will cause deflection of the galvanometer I, the extent of deflection being dependent upon the potential difference.

From the point G there extends a connection, including a galvanometer I, to the contact c, movable along the slide wire S which is a portion of the resistance R between the points A and B, as in Fig. 2. Associated with the slide wire S is a graduated scale s with which co-acts a pointer, such as the contact c itself or a pointer movable therewith.

To determine the relative humidity, the operator adjusts the contact c upon slide wire S to such position that the deflection of the galvanometer I is zero, in which case there is a balance of potential differences related to the two networks affected, respectively, by the thermometer resistances W and D, such balance effecting a determination of the ratio of the quantity $(T-a)$ to the quantity $(t-b)$, which is a determination of the relative humidity. The scale s may be calibrated in terms of percentage of humidity, or equivalent units, and the humidity or equivalent is directly readable from the scale s upon effecting the aforesaid balance.

As stated above, the relations indicated by Fig. 1 are not strictly true, particularly as regards the intersection of the humidity lines H at a common point P. It is also not strictly true that the humidity lines are straight and not curved, though within the usual or important range of humidities, as from about 10% or 20% to 100%, the humidity lines may be assumed to be straight.

Further in accordance with my invention refinements are introduced, particularly for compensating or correcting for the error in the assumption that the humidity lines intersect at a common point as P.

The formula for relative humidity, as given by Landolt-Börnstein, is taken as correctly representing the facts, and is as follows:

$$\text{Relative humidity} = \frac{p^2 - 1/2(T-t)\frac{b}{755}}{p^1} = \frac{p^3}{p^1}$$

in which:

T = dry bulb temperature in degrees C.
t = wet bulb temperature in degrees C.
$p^1$ = pressure, in millimeters of mercury, of saturated water vapor at temperature T.
$p^2$ = pressure, in millimeters of mercury, of saturated water vapor at temperature t.
$p^3$ = actual pressure, in millimeters of mercury, of the water vapor present at temperature T.
b = barometric pressure in millimeters of mercury.

For any one value of relative humidity, the relation between the dry bulb temperature T and the wet bulb temperature t is nearly linear. That is, if for any one value of relative humidity a curve is plotted showing the relation between T and t, it will be nearly a straight line for the range of values of T and t commonly encountered.

Taking the barometric pressure b as constant and equal to 755 millimeters, there are computed from the foregoing formula corresponding values of T and t for various values of relative humidity. By the method of least squares, equations are determined of the straight lines which best represent the relations of T and t for the several relative humidities. Substituting back into these equations the values for T of, for example, 40, 30, 20 and 10 degrees C., the corresponding values of t are obtained which, when compared with the correct values of t, show that the errors, arising from the assumption that the relation between T and t is linear for any relative humidity, are small throughout the entire range of relative humidities, from zero to 100%, the average deviation from a straight line being .05 degree C. and the maximum deviation .13 degree C. In the more general range of humidities from 30% to 100% the average and maximum deviations are respectively .03 and .06 degree C.

Fig. 5 is a plot of the assumed linear equations aforementioned which best represent the relations between T and t for various relative humidities. If these straight lines are extended downwardly and to the left, beyond the range in which they are actually used, they all intersect each other at points which do not lie far apart. However, it is apparent that the humidity lines H do not intersect each other at a common point, and that, accordingly, for higher accuracy, it is desirable to compensate or correct for the noncoincidence of the points of intersection. It is immaterial for the purpose in mind whether or not the extrapolation of the lines H below zero degree centigrade correctly represents the state of affairs in the region below that temperature, the essential point being that they are extensions of lines which do represent the facts in the temperature region to be used or of interest.

The point in Fig. 5 through which all of the straight lines most nearly pass is indicated at $z$, but the assumption of $z$ as a single or common point of intersection may introduce an error whose maximum is .3 degree centigrade. While this departure seems small, it is not inconsequential, since differences of this order indicate, for or at some temperatures, relatively large variations in relative humidity, and, to compensate for these differences, it is desirable as by means hereinafter described, to effect correction.

An inspection of Fig. 5 shows that the vertical and horizontal dimensions of the band enclosing the set of straight lines H is a minimum at a point $P^1$ where the 20% and 100% humidity lines intersect, that is, at $T = t = -10.77$ degrees centigrade. The point $P^1$ is indicated in Fig. 5 at the intersection of the short horizontal and vertical lines $x$ and $y$.

Fig. 6 is a plot of the values t with reference to the values of the slopes of the corresponding constant humidity lines; ordinates are wet bulb temperatures t and abscissæ are reciprocals of slopes of the constant humidity lines, the dry bulb temperature being constant at the aforesaid $-10.77$ degrees centigrade. Fig. 10, later to be referred to, is a similar plot, for a constant wet bulb temperature of the aforesaid $-10.77$ degrees centigrade, of the values of T as ordinates, with reference to abscissæ representing slopes of the constant humidity lines.

Returning to Fig. 5, it is noted that the point $P^1$, corresponding to $T = t = -10.77$ degrees, is the intersection of the humidity lines H for both 20% and 100% humidity. Heretofore it has usually been assumed that the temperature corresponding to the point $P^1$ might be taken as the point of reference for all the humidities within that range or within the range to be dealt with. The point of reference, $P^1$, however, is not on any other humidity line and, therefore, cannot be taken as the reference point for the other humidities. Fig. 6 shows what wet bulb reference temperature t corresponds to the value of $T = -10.77$ degrees for each of the several percentages of humidity. Accordingly, as the humidity varies it is necessary or desirable to measure or indicate, not always the ratio $$\frac{T-(-10.77)}{t-(-10.77)}$$

but a ratio varying from $$\frac{T-(-10.77)}{t-(-10.77)} \text{ to } \frac{T-(-10.77)}{t-(-11.58)}$$

the temperature −11.58 being, for example, the greatest variation from −10.77 that needs to be taken into consideration, as indicated by Figs. 5 and 6.

At 80% humidity, for example, the wet bulb reference temperature $t$ for dry bulb reference temperature −10.77 is −11.28, and in consequence the ratio it is required to indicate is $$\frac{T-(-10.77)}{t-(-11.28)}$$

Accordingly, instead of having the point G, Fig. 3, a fixed point, it is actually made movable or adjustable through a range, such, for example, as somewhat less than 1 degree centigrade, and in accordance with the relations exemplified in Fig. 6.

For this purpose a circuit arrangement such as indicated in Fig. 7 is utilizable where the circuit arrangement of Fig. 3 is varied by including in the branch with the resistances $R_5$, $R_6$ and W a slide wire resistance $S_1$ which is circumferentially continuous and with circuit connections thereto from resistances $R_5$ and $R_6$ to opposite sides thereof.

Figure 8:
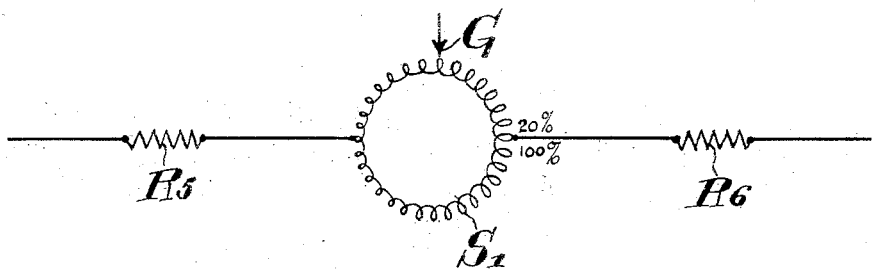
Fig. 8 is an illustration, in greater detail, of the correcting or compensating means.

In Fig. 8 the slide wire resistance $S^1$ is shown on larger scale. It is tapered, graded or graduated in the sense that for equal circumferential displacements of the contact or point G upon the slide wire resistance the increments of resistance change are not equal. As indicated in Fig. 6, the magnitudes of correction change in one sense and then reverse in sense. The slide wire $S^1$ accords with this requirement in that, for example, in the region for both 20% and 100% humidity, rate of change is greater than in the region between 40% and 60% humidity. In Fig. 8, therefore, the connection to the right hand side of the slide wire $S^1$ corresponds with both 20% and 100% humidity, the increment of resistance change decreasing with movement of the slide wire in either direction, toward the opposite side of the slide wire in the vicinity, for example, of 50% and 55%, where the increment of change of resistance is smallest.

In Fig. 8 the slide wire resistance conductor $S^1$ is helically wound, but varies in diameter, the pitch being circumferentially uniform. Any other equivalent arrangement may be utilized. The grading or graduation need not be effected with great accuracy, since an error of 5% produces an effect equivalent to an error of only .05 degree centigrade in the wet bulb temperature.

In Figs. 7 and 8 the resistance $R^5$ includes the resistance of the coil $R^5$ itself and that portion of the slide wire $S^1$ to the left of the contact G and a point of the same potential as the point G on the opposite side of the slide wire $S^1$; and the resistance $R^6$ is the resistance of the coil $R^6$ itself and that portion of the slide wire $S^1$ to the right of the contact G and a point of the same potential as the point G on the opposite side of the slide wire $S^1$.

In Fig. 9 a composite circuit is illustrated, generally similar to Fig. 4, and comprising specifically the combinations of Figs. 7 and 2, the resistance R of Fig. 2 being partially made up of a slide wire S as in Fig. 4. The position of the contact $c$ is adjusted with respect to the slide wire S, Fig. 9, until the galvanometer I indicates zero current, when the ratio representative of the humidity is determined, and the relative humidity may be read directly upon the scale $s$. The introduction of the slide wire $S^1$ involves no additional balancing operation, since the position of the slide wire $S^1$ with respect to the contact or point G is a function only of the humidity. Therefore, if the slide wires S and $S^1$ move in unison with respect to their contacts $c$ and G, the adjustment of S effects simultaneous proper setting of $S^1$ to procure corrected reading. In an automatic recorder or controller, as of the character hereinafter described in connection with Fig. 13, the slide wires S and $S^1$ move in unison with respect to their contacts $c$ and G, respectively, whereby, when the humidity balance is automatically determined, the slide wire $S^1$ is simultaneously automatically brought to proper position to correct for the change in wet bulb reference temperature with respect to humidity.

In event the correction for change in reference temperature is made in accordance with Fig. 10, for constant wet bulb reference temperature, a slide wire, such as $S^1$ above referred to, is associated with a circuit arrangement including the dry bulb resistance D, as indicated in Fig. 11, in which case the point A is variable or adjustable with respect to the slide wire $S^1$.

In Fig. 12 the arrangement of Fig. 11 is combined with an arrangement of the character of Fig. 3, and the resistance R of the network corresponding to Fig. 2 includes the balancing slide wire S.

Here again the action is substantially that described in connection with Fig. 9, and, in the case of a recorder or control apparatus, the slide wires S and $S^1$ are again mounted to move in unison with relation to their respective contacts $c$ and A.

Of Figs. 2, 9, 11 and 12 it is true that between the points A and B there always exists a difference of potential; and the same is true as between the points G and F in Figs. 3, 7, 9 and 12. In other words the systems are potentiometric in that each unit or component network of the composite networks of Figs. 9 and 12 is arranged to produce a potential difference; furthermore these potential differences are then combined in any suitable way, as in opposition to each other, as in a null method.

It is well known that the galvanometer and source of electro-motive-force in a simple Wheatstone bridge may be interchanged without affecting, to any appreciable extent, the degree of balance or sensitiveness of the bridge. In the networks herein described and illustrated, the galvanometer and source of electro-motive-force may be interchanged without affecting normal operation of the system.

For automatic indication, measurement, recording or control of relative humidity any suitable apparatus may be employed. As an example, there may be utilized apparatus of the character disclosed in prior Letters Patent to Leeds, No. 1,125,699, January 19, 1915.

In Fig. 13 apparatus of this general character is shown under control of the aforesaid galvanometer I of Fig. 9 or Fig. 12.

The movable coil or equivalent movable member of the aforesaid galvanometer I is shown in Fig. 13 at K for deflecting the needle or pointer $k$ whose sense and extent of deflection control the sense and extent of rotation of the shaft or movable structure 10. In other words, the deflecting system of the galvanometer controls a disengageable mechanical connection between the electric motor M and the movable structure or shaft 10 whose direction and extent of movement depend upon the extent and sense of deflection of the member $k$. The recording paper or sheet J is advanced at constant rate by the motor M past the marker or pen $j$ which is moved transversely of the record sheet by the movable structure 10. Upon the shaft 10 is secured the disk L upon which are disposed the two slide wires S and $S^1$ of Fig. 9 or Fig. 12. The slide wire S may be a helix of uniform diameter and pitch, while the slide wire $S^1$, as stated, is suitably graded in any way, and may be a circumferentially continuous helix of substantially constant circumferential pitch, but varying in diameter as indicated in Fig. 8. To opposite sides of the slide wire $S^1$ are connections bringing it into circuit with the resistances $R^5$ and $R^6$, Fig. 9, or with $R^1$ and $R^2$, Fig. 12.

Upon the disk L, or anywhere upon the movable structure 10, may be provided the scale $s$ with which co-acts a stationary index or pointer $c^1$ for reading or indicating directly the relative humidities determined.

Clockwise rotation of the slide wires S and $S^1$ in Fig. 13, corresponds with increase of relative humidity; and similarly traverse of the record paper J by the marker $j$ from left toward the right is in accord with increase in humidity. For example, at the left margin of the paper may be a graduation corresponding with 20% humidity, while to the right may be the graduations corresponding with magnitudes up to 100% humidity at the right margin; the curve or record drawn by the marker $j$ upon the sheet J will, therefore, be a continuous record of relative humidity with respect to time.

As the movable structure is rotated in one direction or the other, the position of the contact $c$ upon the slide wire S is varied in such sense as to tend to effect a balance of the character hereinbefore described, causing reduction in the deflection of the galvanometer I, until eventually when balance is obtained, the galvanometer needle $k$ is in its mid-position and the movable structure 10 is not rotated in either direction until there occurs a change in the relative humidity.

The apparatus may be utilized also for controlling or varying the magnitude of relative humidity, or for maintaining it constant. For this purpose there may be secured upon the shaft 10 a disk N having a lug or cam element $n$ which in rotation in one direction closes the contacts $o$ and in opposite direction closes the contacts $q$, these contacts controlling, respectively, the relay windings $r$ and $r^1$. When the relay $r$ is energized, current from the supply circuit conductors 1 and 2 is delivered through the reversible electric motor $M^1$ causing its rotation in one direction, and, when the relay $r^1$ is energized, the motor $M^1$ is energized to rotate in opposite direction. The motor $M^1$ through any suitable gearing operates a valve V in the conduit O to control the rate of delivery or flow of any agent which will vary the humidity. For example, the conduit O may control the delivery of vapor into the gas or air whose relative humidity is to be maintained at a predetermined magnitude. This rate of delivery will be varied in proper sense and to proper extent by the control mechanism of Fig. 13, under control of a circuit such as shown in Fig. 9 or Fig. 12, whose dry and wet bulb resistances D and W are disposed in the air or gas whose humidity is controlled.

It will be understood that the galvanometer and source of electro-motive-force may be interchangeably related to the network, as previously explained, and the appended claims are to be considered in the light of the foregoing explanation.

What I claim is:

1. The method of determining relative humidity, which comprises producing a difference of potential representative of the departure of the dry bulb temperature from a reference temperature, producing a difference of potential representative of the departure of the wet bulb temperature from a reference temperature, and opposing said potential differences to each other to determine the ratio of one of them to the other.

2. The method of determining relative humidity from dry and wet bulb temperatures, which comprises determining a point whose potential differs from a fixed reference potential by an amount representative of the departure of the temperature of one of the bulbs from a reference temperature, producing a potential at a point differing from said fixed reference potential by an amount representative of the departure of the temperature of the other bulb from a reference temperature, and determining the ratio of one of said potential differences to the other.

3. The method of determining relative humidity from dry and wet bulb temperatures, which comprises determining a point whose potential differs from a fixed reference potential by an amount representative of the departure of the temperature of one of the bulbs from a reference temperature, producing a potential at a point differing from said fixed reference potential by an amount representative of the departure of the temperature of the other bulb from a reference temperature, and opposing said potential differences to each other to determine the ratio of one of them to the other.

4. The method of determining relative humidity, which comprises producing a difference of potential representative of the departure of the dry bulb temperature from a reference temperature, producing a difference of potential representative of the departure of the wet bulb temperature from a reference temperature, modifying one of said potential differences to compensate for variations of a reference temperature from a constant magnitude, and determining the ratio to each other of the potential difference so modified and the other potential difference.

5. The method of determining relative humidity, which comprises producing a difference of potential representative of the departure of the dry bulb temperature from a reference temperature, producing a difference of potential representative of the departure of the wet bulb temperature from a reference temperature, modifying one of said potential differences to compensate for variations of a reference temperature from a constant magnitude, and opposing the potential difference so modified and the other potential difference to each other to determine their ratio to each other.

6. The method of determining relative humidity from dry and wet bulb temperatures, which comprises determining a point whose potential differs from a fixed reference potential by an amount representative of the departure of the temperature of one of the bulbs from a reference temperature, producing a potential at a point differing from said fixed reference potential by an amount representative of the departure of the temperature of the other bulb from a reference temperature, modifying one of said potential differences to compensate for variations of a reference temperature from a constant magnitude, and determining the ratio to each other of the potential difference so modified and the other potential difference.

7. The method of determining relative humidity from dry and wet bulb temperatures, which comprises determining a point whose potential differs from a fixed reference potential by an amount representative of the departure of the temperature of one of the bulbs from a reference temperature, producing a potential at a point differing from said fixed reference potential by an amount representative of the departure of the temperature of the other bulb from a reference temperature, modifying one of said potential differences to compensate for variations of a reference temperature from a constant magnitude, and opposing to each other the potential difference so modified and the other potential difference to determine their ratio.

8. A composite network for determining the relation to each other of potential differences, comprising component networks in parallel with each other across a source of electro-motive-force, each component network comprising branches in parallel with each other, a variable impedance in one branch of each component network, and a galvanometer in a connection from a point between impedances in a branch including one of said variable impedances to a point between impedances in the branch of the other component network containing the other variable impedance.

9. A composite network for determining the relation to each other of potential differences, comprising component networks in parallel with each other across a source of electro-motive-force, each component network comprising branches in parallel with each other, a variable impedance in one branch of each component network, an impedance connected across the branches of one component network, and a galvanometer in a connection from a point variable along said last-named impedance to a point between impedances in the branch of the other component network including the variable impedance of said other component network.

10. A composite network for determining the relation to each other of potential differences, comprising component networks in parallel with each other across a source of electro-motive-force, each component network comprising branches in parallel with each other, a variable impedance in one branch of each component network, and a galvanometer in a connection from a point in one component network to a point variable along an impedance in series with the branch of the other component network including the variable impedance of said other component network.

11. A composite network for determining the relation to each other of potential differences, comprising component networks in parallel with each other across a source of electro-motive-force, each component network comprising branches in parallel with each other, a variable impedance in one branch of each component network, an impedance connected across the branches of one component network, and a galvanometer in a connection from a point variable along said last-named impedance to a point variable along an impedance in series with the branch of the other component network including the variable impedances of said other component network.

12. A composite network for determining the relation to each other of potential differences, comprising component networks in parallel with each other across a source of electro-motive-force, each component network comprising branches in parallel with each other, a variable impedance in one branch of each component network, an impedance connected across the branches of one component network, a galvanometer in a connection from a point variable along said last-named impedance to a point variable along an impedance in series with the branch of the other component network including the variable impedance of said other component network, and means for moving said points along their respective impedances in unison.

13. A composite network for determining the relation to each other of potential differences, comprising component networks in parallel with each other across a source of electro-motive force, each component network comprising branches in parallel with each other, a variable impedance in one branch of each component network, an impedance connected across the branch of one component network, a galvanometer in a connection from a point variable along said last-named impedance to a point variable along an impedance in series with the branch of the other component network including the variable impedance of said other component network, a movable structure causing movement of said points along their respective impedances in unison with each other, and means controlled by said galvanometer determining the extent and direction of movement of said movable structure.

14. A system for determining relative humidity comprising a composite network having a plurality of component networks in parallel with each other across a source of electro-motive-force, each of said component networks comprising parallel branches, an impedance in one branch of one of said component networks variable in accordance with the dry bulb temperature, an impedance in one branch of another of the component networks variable in accordance with the wet bulb temperature, and a galvanometer in a connection between points in said branches including said variable impedances for determining the ratio of the departure of the dry bulb temperature from a reference temperature to the departure of the wet bulb temperature from a reference temperature.

15. A system for determining relative humidity from dry and wet bulb temperatures comprising a composite network having component networks in parallel with each other across a source of electro-motive-force, each component network comprising branches in parallel with each other, a branch of each component network including an impedance, said impedances being variable in accord with dry and wet bulb temperature, respectively, an impedance connected between the branches of one of said component networks, and a galvanometer in a connection from a point variable along said last-named impedance to a point in that branch of another of said component networks including the impedance variable in accordance with temperature.

16. A system for determining relative humidity comprising a composite network having a plurality of component networks in parallel with each other across a source of electro-motive-force, each of said component networks comprising parallel branches, an impedance in one branch of one of said component networks variable in accordance with the dry bulb temperature, an impedance in one branch of another of the component networks variable in accordance with the wet bulb temperature, an impedance connected across the branches of one component network, and a galvanometer in a connection from a point variable along said last-named impedance to a point variable along an impedance in that branch of another of said component networks including the impedance variable in accordance with temperature, movement of said last-named point along its impedance compensating for variation of reference temperature from constant magnitude.

17. A measuring circuit comprising the combination with a source of electro-motive-force, of a plurality of branches in parallel with each other connected in circuit with said source, a variable impedance in one of said branches, an impedance in another of said branches comprising a closed loop, said last branch connected to said loop at different points thereof, and a contact movable along said loop impedance.

18. In a measuring circuit, the combination with a source of electro-motive-force, of an impedance in circuit therewith and comprising a closed loop, connections to different points in the loop, and a contact movable along said impedance between said points, the impedance of said loop per unit length thereof varying between said points of connection.

19. In a measuring circuit, the combination with a source of electro-motive-force, of an impedance in circuit therewith and comprising a closed loop, connections to different points in the loop, a variable impedance in one of said connections, and a contact movable along said first-named impedance between said points of connection, the impedance of said loop per unit length thereof varying between said points of connection.

20. A measuring circuit comprising the combination with a source of electro-motive-force, of a plurality of branches in parallel with each other connected in circuit with said source, a variable impedance in one of said branches, an impedance in one of said branches comprising a closed loop, said one of said branches connected to said loop at different points thereof, and a contact movable along said loop impedance, the impedance of said loop per unit length thereof varying between said points of connection.

21. In a measuring circuit, the combination with a source of electro-motive-force, of an impedance in circuit therewith and comprising a closed loop, connections to different points in the loop, and a contact movable along said impedance between said points, the impedance per unit of length of said loop varying in both directions along the loop from one of said connections to the other.

22. A composite network for determining the relation to each other of two potential differences comprising component networks in parallel with each other across a source of electro-motive-force, each component network comprising branches in parallel with each other, a variable and a plurality of fixed impedances in each of said component networks, and a galvanometer in a connection from a point between impedances in a branch including one of said variable impedances to a point between impedances in the branch of the other component network containing the other variable impedance, said fixed impedances being of such magnitude that the ratio of a particular potential difference to the other is always equal to, or greater than unity.

23. A system for determining relative humidity comprising a composite network having a plurality of component networks in parallel with each other across a source of electro-motive-force, each of said component networks comprising parallel branches, fixed impedances in each of said component networks, an impedance in one branch of one of said component networks variable in accordance with the dry bulb temperature, an impedance in one branch of another of the component networks variable in accordance with the wet bulb temperature, and a galvanometer in a connection between points in said branches including said variable impedances for determining the ratio of the departure of the dry bulb temperature from a reference temperature to the departure of the wet bulb temperature from a reference temperature, said fixed impedances being of such magnitudes that the difference in potential produced by the impedance variable in accordance with the dry bulb temperature is always equal to, or greater than, the difference in potential produced by the impedance variable in accordance with the wet bulb temperature.

24. A composite network for determining the relation to each other of potential differences, comprising component networks in parallel with each other across a single source of electro-motive-force, each component network comprising branches in parallel with each other, a variable impedance in one branch of each component network whereby variations in potential difference are produced between points in different branches of each network by variations in the magnitude of the respective impedances, and a galvanometer in series with an adjustable impedance connected between a point in each component network for determining the ratio between said potential differences.

25. In combination with a network in the nature of a Wheatstone bridge having in one of its conjugate conductors a source of electro-motive-force, of an impedance included in the second conjugate conductor of said bridge, and a conductor including a galvanometer connected between a point in said second conjugate conductor and a point whose potential is dependent upon said source of electro-motive-force.

26. A network including a circuit in the nature of a Wheatstone bridge having in one of its conjugate conductors a source of electro-motive-force, of an impedance included in the second conjugate conductor of said bridge, and a conductor including a galvanometer connected between a point in said second conjugate conductor and another point in said network.

27. A network including a circuit in the nature of a Wheatstone bridge having in one of its conjugate conductors a source of electro-motive-force, of an impedance included in the second conjugate conductor of said bridge, a branch upon said Wheatstone bridge in said network, and a conductor including a galvanometer connected between a point in said second conjugate conductor of said bridge and a point in said branch.

28. A network comprising a plurality of components at least one of which is in the nature of a Wheatstone bridge, a variable impedance in an arm of said bridge, an impedance in a conjugate conductor of said bridge, and a conductor including a galvanometer connected between a point in said conjugate conductor of said bridge and a point in another of said components of said network.

29. A network comprising a plurality of components, two of which are in the nature of Wheatstone bridges, a variable impedance in an arm of each of said bridges, an impedance in a conjugate conductor of one of said bridges, and a conductor including a galvanometer connected between a point in said conjugate conductor of said one of said bridges and a point in the other of said bridges.

30. A network including a circuit in the nature of a Wheatstone bridge having in one of its conjugate conductors a source of electro-motive-force, of an impedance included in the second conjugate conductor of said bridge, and a conductor including a galvanometer connected between a point in said second conjugate conductor and a point in said network whose potential varies independently of said bridge.

31. A network including a circuit in the nature of a Wheatstone bridge having in one of its conjugate conductors a source of electro-motive-force, of an impedance included in the second conjugate conductor of said bridge, a branch upon said bridge, a conductor including a galvanometer connected between a point in said second conjugate conductor of said bridge and a point in said network external to said bridge, and means independent of said bridge for varying the potential of said last named point.

32. A network including a circuit in the nature of a Wheatstone bridge having in one of its conjugate conductors a source of electro-motive-force, of an impedance included in the second conjugate conductor of said bridge, a conductor including a galvanometer connected between a point in said conjugate conductor of said bridge and a second point in said network external to said bridge, and means for imparting to said second point a potential dependent upon the potential of a third point in said network external to said bridge, the potential between said third point and said point in said conjugate conductor being proportional to the current through said conjugate conductor.

33. A network including a circuit in the nature of a Wheatstone bridge having in one of its conjugate conductors a source of electro-motive-force, of an impedance included in the second conjugate conductor of said bridge, and a conductor including a galvanometer connected between a contact movable along said impedance and another point in said network.

34. A network including a circuit in the nature of a Wheatstone bridge having in one of its conjugate conductors a source of electro-motive-force, of an impedance included in the second conjugate conductor of said bridge, a branch upon said Wheatstone bridge in said network, and a conductor including a galvanometer connected between a contact movable along said impedance and a point in said branch.

35. A network including a circuit in the nature of a Wheatstone bridge having in one of its conjugate conductors a source of electro-motive-force, of an impedance included in the second conjugate conductor of said bridge, and a conductor including a galvanometer connected between a contact movable along said impedance and a point in said network whose potential varies independently of said bridge.

36. A network including a circuit in the nature of a Wheatstone bridge having in one of its conjugate conductors a source of electro-motive-force, of an impedance included in the second conjugate conductor of said bridge, a branch upon said bridge, a conductor including a galvanometer connected between a contact movable along said impedance and a point in said network external to said bridge, and means independent of said bridge for varying the potential of said last named point.

LEO BEHR.